J. F. McELROY.
PROTECTIVE CONDUIT HOLDER FOR ELECTRICAL CONNECTIONS.
APPLICATION FILED SEPT. 11, 1908.
923,686.
Patented June 1, 1909.
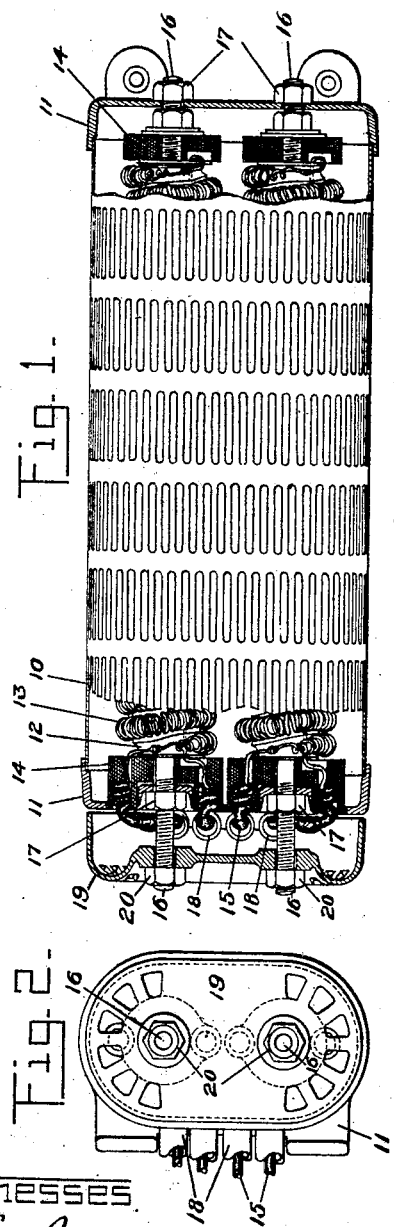
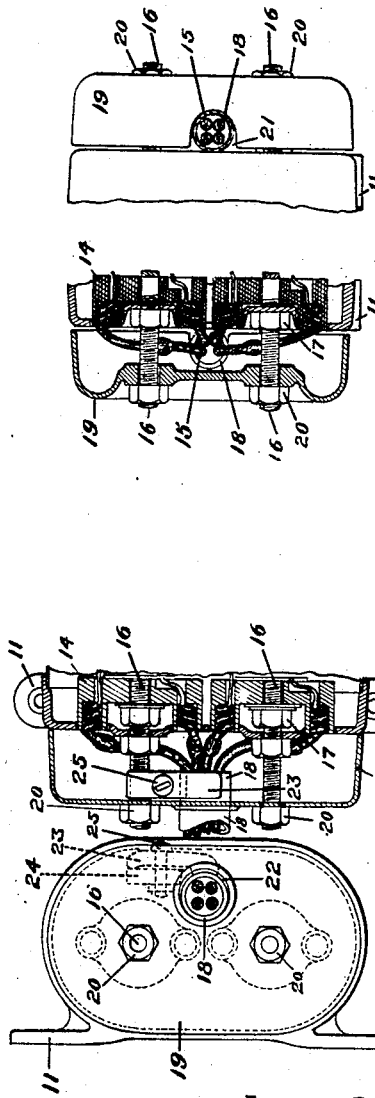
Witnesses
F. E. Nares
W. R. Schulz
Inventor
James F. McElroy,
by Robert M. Pierson,
Atty.

UNITED STATES PATENT OFFICE.

JAMES F. McELROY, OF ALBANY, NEW YORK, ASSIGNOR TO CONSOLIDATED CAR-HEATING COMPANY, OF ALBANY, NEW YORK, A CORPORATION OF WEST VIRGINIA.

PROTECTIVE CONDUIT-HOLDER FOR ELECTRICAL CONNECTIONS.

No. 923,686.  Specification of Letters Patent.  Patented June 1, 1909.

Application filed September 11, 1908. Serial No. 452,586.

*To all whom it may concern:*

Be it known that I, JAMES F. McELROY, a citizen of the United States, residing at Albany, in the county of Albany and State of New York, have invented certain new and useful Improvements in Protective Conduit-Holders for Electrical Connections, of which the following is a specification.

This invention relates to devices for protecting electrical joints or connections such as the connection between the conductors of an electric heater and the outside wires which bring current to the heater.

The invention relates more particularly to a protector or junction-box having means for holding or clamping the end of a conduit or conduits in which the outside wires are inclosed so that the conduit is bound to the heater casing (or to an equivalent casing or support) and my principal objects are to simplify the construction and method of attachment of the protective device, and provide greater facility in the making of connections after the heater or equivalent element is in place. I aim especially to permit a freer access to the connections than has heretofore been possible, without disturbing the wire conduit or removing part of the heater casing.

The accompanying drawings show my invention in several forms, applied to a double electric heater.

Figure 1 represents a front elevation partly in section illustrating one form adapted for plural conduits. Fig. 2 represents an end elevation. Fig. 3 represents a longitudinal vertical section of a modified embodiment adapted for a single conduit. Fig. 4 represents a rear elevation of the latter. Fig. 5 represents a view similar to Fig. 3 showing a third embodiment. Fig. 6 represents an end elevation of the latter.

In the drawings, 10 is the body of an elliptical heater casing having supporting end-brackets 11 constituting the heads of the casing, insulating cores 12 on which the resistant wire heating-elements 13 are wound, perforated insulating end-disks 14 through which the heater wires are extended to attach them to the outside wires 15, and central rods 16 which support the insulating cores and are threaded to receive nuts 17 abutting the end brackets 11 and serving to bind the parts of the heater and its casing together.

In Figs. 1 and 2 I have indicated four conduits 18 containing the outside wires which carry current to the two heating circuits, said conduits having their ends at right-angles to the axial plane of the heater, and on one end of the heater I have provided a cap 19 constituting a holder or clamp for the conduit-ends and providing a space between itself and the end of the heater-casing in which the connections are made between the heater wires and the outside wires. One edge of this cap is recessed to fit the contour of the conduits and the cap is detachably secured in place preferably by extending the threaded ends of the rods 16 and providing nuts 20 thereon outside of the cap, whereby said cap may be drawn toward the heater by axial pressure and caused to bind the ends of the conduits 18 between itself and the brackets 11. By reason of this construction the cap may be put in place after the heater is all set up and the wire connections made, and said cap may be removed and free access afforded to the connections on removing the nuts 16, without requiring any displacement of the wire conduits. The modification shown in Figs. 3 and 4 is the same in principle, but has only one recess 21 in its rear edge, for the reception of a single large conduit 18 which contains all of the outside wires.

When the wire conduit comes in to the heater endwise or axially, instead of laterally I form the end-wall of cap 19 with an aperture 22 slightly larger in diameter than the conduit 18, as shown in Figs. 5 and 6, and open clear through, so that the cap can be slid back on the conduit without disturbing the position of the latter, when it is desired to have access to the wire connections. There is also provided on the inside of the cap a small clamping plate or lever 23, fulcrumed at one end on a lug 24 which is cast on the cap 19, and attached to said lug by a screw bolt 25, the latter serving to draw the free end of the clamping plate 23 against the conduit to the cap. The head of bolt 25 is accessible through an opening in the front wall of cap 19. In assembling this form of my invention with the heater, the cap 19 is slipped over the outside wires and the end of the conduit 18 before the wire connections are made, and when the connections have been made, the cap is advanced into place and drawn up by the nuts 20, whereupon the clamp 23 is tightened against the conduit.

I claim:—

1. The combination of an electric heater comprising insulating end disks, a heating coil between said disks, a rod extending through said coil and serving to bind the parts of the heater together, said rod having an extension, a protective member forming a space for inclosing the connection between the heating coil and the outside wire, and means coöperating with the rod extension and the protective member for detachably securing said member to the heater.

2. The combination of an electric heater and its casing, a rod serving to hold the parts of the heater and casing together and provided with a threaded extension, a cap on the end of the heater forming a space between itself and the heater casing for protecting the electrical connection between the heater and the outside wire, and a nut on said rod extension serving to detachably secure said cap to the casing.

3. The combination of an electric heater, a laterally inleading wire conduit, a protective cap forming a space between itself and the end of the heater to inclose the wire connection and serving to clamp said conduit to the heater, and means for drawing the cap to the heater.

4. The combination of an electric heater, a cap having means for detachably securing it by endwise pressure to one end of said heater and forming a space for inclosing the wire connection, said cap being recessed on one edge to receive a wire-conduit, and a laterally inleading wire conduit clamped between the recessed edge of the cap and the end of the heater by the endwise pressure of the cap.

In testimony whereof I have hereunto set my hand in the presence of two subscribing witnesses, this eighth day of September, 1908.

JAMES F. McELROY.

Witnesses:
BEULAH CARLE,
WILLIAM A. MORRILL, Jr.